United States Patent [19]

Jaffee et al.

[11] Patent Number: 4,459,368
[45] Date of Patent: Jul. 10, 1984

[54] PARTICULATE SORBING AND DEODORIZING MIXTURES CONTAINING SYNTHETIC AND CLAY SORBENTS

[75] Inventors: Richard M. Jaffee, Lincolnwood, Ill.; Norman B. Gershon, Givrins, Switzerland

[73] Assignee: Oil-Dri Corporation of America, Chicago, Ill.

[21] Appl. No.: 464,519

[22] PCT Filed: Jun. 10, 1981

[86] PCT No.: PCT/US81/00777
§ 371 Date: Jan. 20, 1983
§ 102(e) Date: Jan. 20, 1983

[87] PCT Pub. No.: WO82/04408
PCT Pub. Date: Dec. 23, 1982

[51] Int. Cl.³ .............................................. B01J 20/12
[52] U.S. Cl. ........................................ 502/80; 119/1; 501/141
[58] Field of Search ............. 252/455 R, 440; 502/80; 501/141, 145, 147; 119/1

[56] References Cited

U.S. PATENT DOCUMENTS 4,264,543  4/1981  Valenta ................................. 264/37

Primary Examiner—Delbert E. Gantz
Assistant Examiner—A. McFarlane
Attorney, Agent, or Firm—Dressler, Goldsmith, Shore, Sutker & Milnamow, Ltd.

[57] ABSTRACT

A particulate, water and oil sorbing composition is disclosed. The composition contains sorbent fuller's earth clay particles and sorbent synthetic particles, e.g. calcium sulfate dihydrate-containing granules, in a weight ratio of about 0.5:9.5 to about 4:6, respectively.

23 Claims, 5 Drawing Figures

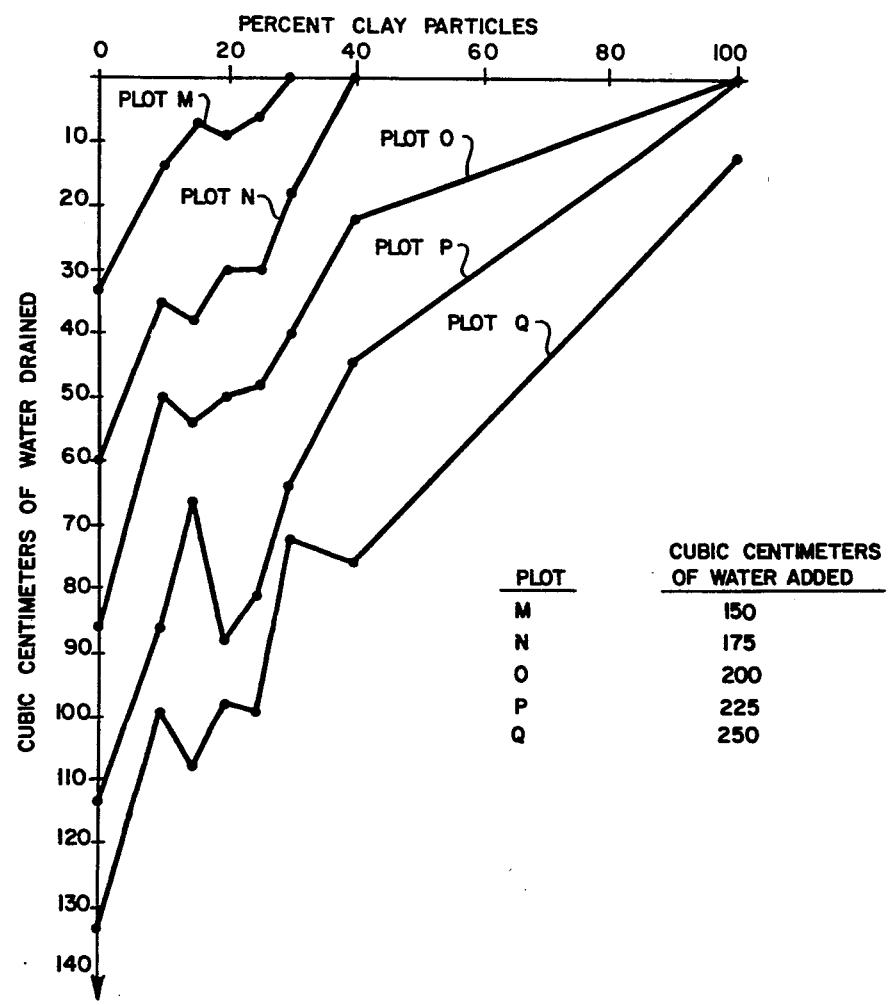

PARTICULATE SORBING AND DEODORIZING MIXTURES CONTAINING SYNTHETIC AND CLAY SORBENTS

TECHNICAL FIELD

This invention relates to sorbing and deodorizing compositions, and particularly to particulate mixtures of particulate synthetic and clay particle sorbents.

BACKGROUND ART

Pulverized, particulate clays, known in the art as fuller's earth or fuller's earth clays, are well-known for their oil and water sorbing properties and for their deodorizing characteristics. As a result, these clays have various industrial and household uses such as for the sorption of oil, grease and the like from floors and elsewhere where such materials represent a safety hazard. In addition, because of their water sorbing and deodorizing characteristics, fuller's earths have been found particularly useful in animal toilet applications, e.g., as a cat box sorbent. Another advantage of fuller's earth clays is their relatively low bulk densities of about 0.4 to about 0.9 kilograms per liter (kg/l) allows the use of relatively light weight sorbents.

Although fuller's earths have excellent sorbing and deodorizing characteristics, their use suffers from several cost-related difficulties. For example, fuller's earth clay deposits in sufficient quantities for commercialization occur only in six locations, five of which are in the United States, with the sixth being in Spain. Thus, large shipping expenses are encountered when world-wide product distribution is sought. Shipping expenses also present a problem within the United States because most of the commercialized deposits occur from southern Illinois through northern Florida, with one deposit in southern California and another in central Texas. Thus, relatively long range shipments are required to distribute the clays even within the United States.

Several methods have been tried to minimize the expense concomitant with the use of fuller's earths by preparing synthetic sorbing and deodorizing compositions from materials which are more readily available. Compositions based upon hydrated commercial grade plaster, calcium sulfate dihydrate, and their methods of manufacture, which are useful replacements for fuller's earth clays as particulate sorbents are exemplified by the teachings of commonly owned U.S. Pat. Nos. 4,163,674, 4,183,763 and 4,264,543. However, while the synthetic sorbtive granules can replace fuller's earth clays as sorbents for oil, water, excreted body fluids and like liquids, it has been found that the effectiveness of synthetic sorptive granules can be further enhanced by admixtures of such synthetic sorptive granules with particulate clay.

SUMMARY OF THE INVENTION

The present invention relates to a particulate, water and oil sorbing composition which contains a substantially uniform mixture of sorbent fuller's earth clay particles and synthetic sorbent particles, e.g. calcium sulfate dihydrate-containing granules; the clay particles being present relative to the synthetic particles at a weight ratio of about 1:9 to about 3:7. The clay particles useful herein have a bulk density of about 0.4 to about 0.9 kg/l and sorb water or oil in an amount more than about 50 percent of their own weight. In addition, the particle size distribution of the clay particles is such that no more than about 60 weight percent of the particles will be retained on a 6 mesh sieve screen. The synthetic particles have a bulk density of about 0.5 to about 0.9 kg/l, sorb water or oil in an amount of more than 30 percent of their own weight, and have a size distribution such that no more than about 20 weight percent are retained on a 6 mesh sieve screen.

The sorbent compositions of the present invention exhibit effective odor abatement properties when used as animal litter and are mixtures wherein the ratio of the weight of clay particles to the weight of synthetic particles is important in order to maximize the water sorbing effect. These compositions are not mere aggregations of previously known materials in which any ratio of ingredients will suffice. The synergistic water sorbing effect of compositions of this invention is shown dramatically by the data plotted in the graphs of the FIGS. 3 and 5 accompanying this specification which Figures and data are discussed in greater detail hereinafter.

One of the advantages of this invention is that superior sorbent compositions are provided. Another feature of this invention is that compositions which contain smaller amounts of the usually better sorbing and more costly clay nevertheless sorb and retain more water than do compositions having a higher content of the same clay. Yet another benefit of this invention is that its compositions can be prepared more inexpensively than compositions containing more of the same clay, while retaining substantially the same amount of water as do those compositions having a higher clay content. Still another feature of this invention is that its compositions have animal toilet deodorizing characteristics which are not too dissimilar from pure fuller's earth clay, and superior to the deodorizing characteristics of their constituent synthetic particles. Additional benefits, features and advantages will be apparent to those skilled in the art from the detailed description which follows.

BRIEF DESCRIPTION OF THE DRAWINGS

In the drawings forming a portion of the specification:

FIG. 5 is a series of plots of Water Sorption Measurement data including compositions of this invention and their constituents illustrating the effect on water sorption of the absence of relatively smaller sized clay particles in the compositions.

DETAILED DESCRIPTION OF THE INVENTION

Figure 1:
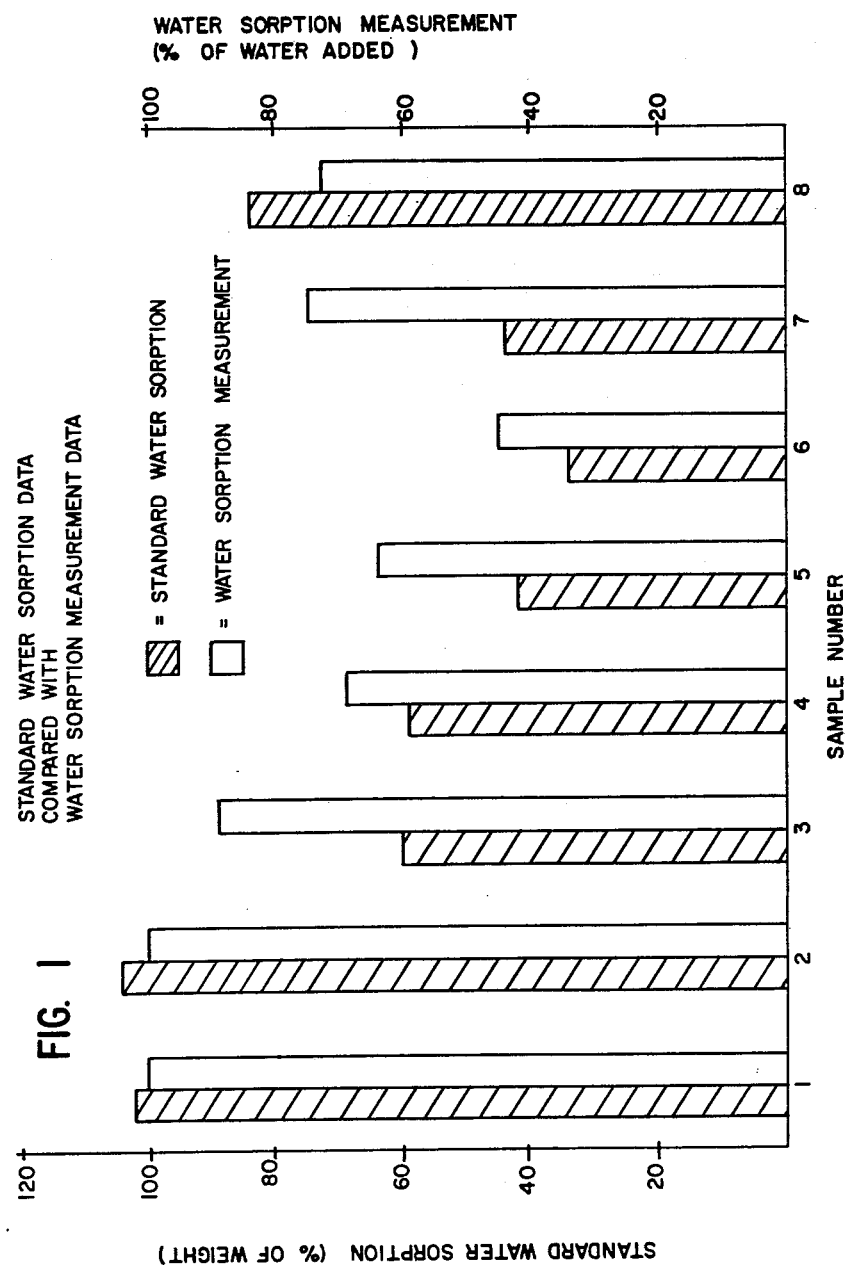
FIG. 1 is a graph comparing Standard Water Sorption data and Water Sorption Measurement data for samples of eight sorbent materials.

The particulate compositions of the present invention sorb water or oil and exhibit odor abatement properties when used as animal litter. As used herein, the word "sorb" in its various grammatical forms includes both absorption and adsorption phenomena.

The compositions of this invention are comprised of a substantially uniform mixture of sorbent fuller's earth clay particles and sorbent, synthetic preferably calcium sulfate dihydrate-containing particles, which are mixed in specific weight ratios. The calcium sulfate dihydrate—containing particles may contain other ingredients integral therewith and preferably contain at least about 50 weight percent calcium sulfate dihydrate. The terms "calcium sulfate dihydrate particles" and "calcium sulfate dihydrate granules" as used herein and in the appended claims mean particles or granules derived from reagent grade calcium sulfate as well as from commercial grade plaster of Paris. By use of the phrase "substantially uniform mixture" it is meant that the individual constituents are sufficiently well mixed so that a sample taken from the mixture will accurately reflect the relative amounts of the mixture's several constituents, and that the constituents in that sample will be distributed approximately evenly therewithin.

The fuller's earth clay, also referred to herein as fuller's earth or clay, constituent of the compositions of this invention is a natural, earthy material composed primarily of hydrous aluminum silicates, while small amounts of non-clay materials can also be present. Typical clays useful herein are montmorillonite, kaolin, illite, halloysite, vermiculite, the sodium and calcium bentonites (clays largely composed of montmorillonite but which can also contain beidellite, attapulgite, and similar minerals), attapulgite, sepiolite, and the like. Calcium bentonite is a particularly preferred clay for the present purposes.

Calcium bentonites can range in color from a cream, off-white to a dark reddish tan color and are frequently referred to in the trade under designations such as Mississippi brown, Mississippi white, Georgia brown and Georgia white. While the chemical and physical properties of the calcium bentonites differ to some extent from each other, and from other fuller's earth clays, these properties are sufficiently similar among the calcium bentonites, and between the calcium bentonites and other fuller's earth clays that one of the calcium bentonite clays can be used as exemplary of the whole class of calcium bentonites, and of fuller's earth clays generally. Thus, Georgia white (GW) clay will generally be used herein and in the Examples as exemplary of the fuller's earth clays.

The clays used herein are utilized in a particulate state. As offered commercially, these clays are sold having a broad range of particle sizes. Commercial products, having a given range of particle sizes, also differ in the distribution or proportion of particles having each particular size.

Particle size, and distribution for the clays and synthetic particles useful herein are conveniently measured by sieving a sample of the material, and determining the amount of material passed or retained by each of the differently sized mesh of the screens comprising the sieve. The sieve screen mesh sizes used herein are of the U.S. Standard Screen Series, (ASTM Specification E-11-70 values).

When a single mesh size is referred to herein without reference to whether the material was passed through the screen or retained upon it, a plus sign, "+", will designate retention and a minus sign, "−", will designate passage through the screen. Two mesh sizes used together and separated by a virgule, "/", designate passage of the material through the first mesh size and retention by the second listed, larger-numbered mesh size. For example, "−6" indicates passage through a 6 mesh sieve screen, while "+16" indicates retention by a 16 mesh sieve screen. Use of "8/32" indicates passage through a 8 mesh screen and retention by a 32 mesh screen.

The size of the clay particles is of significance to this invention as is the distribution of particle sizes within the clay used. Thus, it has been found preferable that no more than about 60 weight percent of the clay particles pass through a 2 mesh sieve screen and be retained on a 6 mesh sieve screen. It is more preferable that no more than about 40 weight percent of the clay be of a 2/6 mesh size, and most preferably, the clay particles are distributed such that no more than about 20 weight percent are of a 2/6 mesh size.

The bulk density (discussed in detail hereinafter) of the clay particles also plays a role in defining the clays of choice for use herein; i.e., fuller's earth clays, and to a lesser extent, in the performance of the sorbant mixtures. Thus, useful fuller's earth clays typically have bulk densities of about 0.4 to about 0.9 kg/l, and more preferably have bulk densities of about 0.4 to about 0.65 kg/l.

Standard Water and Oil Sorptions (also discussed in detail hereinafter), as a percent of the weight of the clay particle, also act to define the clays. Useful fuller's earth clays sorb water or oil in an amount of more than about 50 percent of the weight of the particle. More preferably, the clays sorb an amount of more than about 60 percent of their own weight, and most preferably sorb an amount of more than about 80 percent of their weight in water or oil. The maximum amount of water or oil sorption for fuller's earth clays is believed to be about 120 percent of the weight of the clay particles.

Synthetic calcium sulfate dihydrate-containing granules useful herein can be prepared by a number of methods, including the methods disclosed in the before-mentioned U.S. Pat. Nos. 4,163,674, 4,183,763 and 4,264,543; the disclosure of each of said patents is incorporated herein by reference to the extent pertinent. The synthetic calcium sulfate dihydrate granules suitable for the sorbing mixtures of this invention can also include light weight naturally absorptive materials as is disclosed in U.S. Pat. No. 4,163,674; plaster-derived synthetic sorbent materials that include other inorganic substances that absorbs water or oil such as calcium carbonate, portland cement, vermiculite, pumice, activated carbon, diatomaceous earth are also suitable for the preparation of present mixtures.

The synthetic calcium sulfate dihydrate-containing granules typically contain at least about 50 weight percent calcium sulfate dihydrate and preferably have a bulk density of about 0.5 to about 0.9 kg/l, and more preferably of about 0.5 to about 0.8 kg/l. These granules preferably sorb oil or water in an amount of more than about 30 percent of their own weight, and more preferably in an amount of more than 50 percent of the weight of the granules. The particle size distribution of these granules is preferably such that no more than about 25 weight percent are passed through a 2 mesh sieve screen and are retained on a 6 mesh sieve screen. More preferably no more than about 15 weight percent are of a 2/6 size.

Useful proportions of the constituents in the compositions of this invention are relatively narrow, while the total amount of the compositions which can be used in a sorbing system can vary from substantially all of that system to a very small amount. Thus, when the clay particles and synthetic calcium sulfate dihydrate granules comprise substantially all of the composition (e.g. more than about 95 percent by weight), the clay particles preferably are present at about 5 to about 40 weight percent of the composition, while the synthetic granules are preferably present at about 95 to about 60 weight percent. More preferably, the clay particles comprise about 10 to about 30 weight percent of the composition with the synthetic granules comprising about 90 to about 70 weight percent; and most preferably, about 15 to about 25 percent of the weight of the composition is comprised of fuller's earth clay particles while about 85 to about 75 percent by weight of the composition is comprised of synthetic calcium sulfate dihydrate granules.

The sorbent compositions of this invention can also be utilized in systems wherein the instant compositions do not constitute substantially all of the weight of the particular system, as where water or oil sorbent such as wood chips or sawdust are also present. When so used, the more generally applicable ratio by weight of the two constituents (clay particles to synthetic particles) is a more appropriate measure of the amount of each constituent used than are the percentages of each constituent based upon the total weight of the composition. The clay particles are preferably present relative to the synthetic particles in a ratio by weight of 0.5:9.5 to about 4:6. More preferably the weight ratio is about 1:9 to about 3:7. Most preferably, the weight ratio of clay particles to synthetic particles is about 1.5:8.5 to about 2.5 to about 7.5.

The reasons for the above weight ratios or range of percentages found suitable herein, and for the values of ratios or percentages themselves, which favor lesser amounts of clay particles over larger amounts, are not understood. It is believed that the synthetic particles perform a wicking function in the present mixtures and, in addition to being sorbent also form a wicking matrix for the clay particles that are distributed throughout the mixture.

Figure 3:
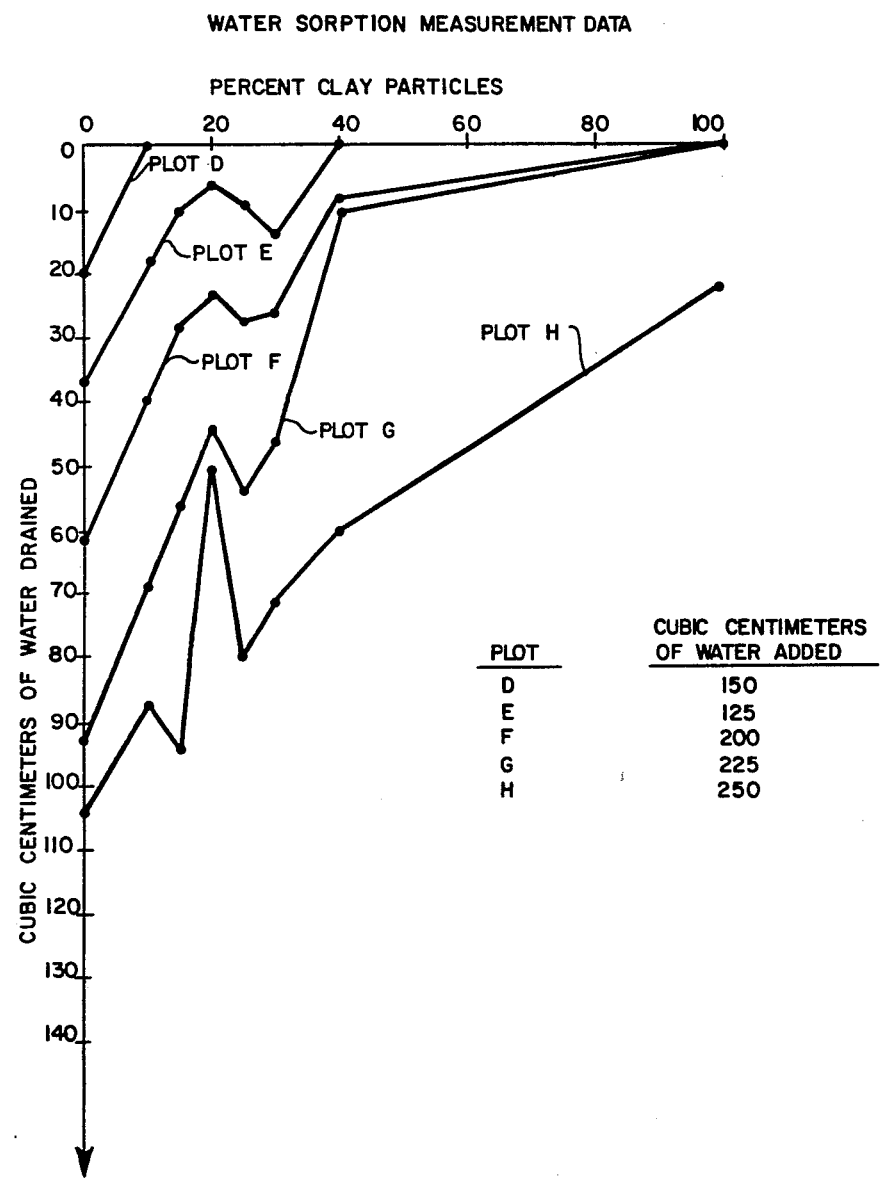
FIG. 3 is a series of plots of Water Sorption Measurement data including compositions of this invention and their constituents.

As is clearly shown by the graphs of the accompanying FIGS. 3 and 5, however, compositions containing the above constituent weight ratios (or percentages) retain more water than do compositions which contain larger amounts of clay and whose compositions fall outside of the weight ratios or percentages of this invention. (The water retention test used for obtaining the data of the graphs of FIGS. 3 and 5 is discussed in detail in Example 1, hereinafter.)

It is pointed out in U.S. Pat. No. 4,264,543 that bulk densities for synthetic granules are inversely related to the sorption capacity of the granules. The same inverse relationship is found for clay particles. In both of the above relationships, the particle size distributions and ingredients of the materials being compared are approximately the same.

The bulk densities of the compositions of the present invention are approximately equal to the sum of the bulk densities of each constituent multiplied by that constituent's proportion of the composition. In fact, knowing the bulk densities of the constituents and the bulk density of the product, one can calculate the approximate percentages of each constituent in the composition. This relationship between the bulk densities of the composition and its constituents can be seen from Plot A in the graphs of FIG. 2 by the almost straight line connecting the bulk density values for each of the individual constituents and the bulk density values for the compositions of this invention.

Since bulk density is inversely proportional to sorption for the constituents of the compositions of this invention, and approximately directly related to the amount of each constituent in the mixture, one skilled in the art would also expect an approximately straight-line, inverse relation between the bulk densities of the compositions and the water and oil sorptions of those compositions. It is found, however, that both water and oil sorptions for the compositions of this invention do not follow the expected, almost linear relation to bulk density, but rather exhibit anomalously higher sorptions than are expected. This can be seen by examination of Plots B and C of the graph of FIG. 2, for standard Water and Oil Sorptions, respectively, and more particularly, by examination of the graphs of FIG. 3 for Water Sorption Measurement data.

The manner in which the clay particles and synthetic granules are mixed is not critical to this invention so long as a substantially uniform mixture of desired proportions is obtained, as discussed hereinbefore. Thus, conventional solids mixing equipment is broadly useful herein. However, it is noted that mixing should not be so vigorous that the particle size distribution of the composition is altered appreciably from that of the constituents due to fracture of the particles during agitation. Mixing can be carried out in a conventional mixer for particulate materials such as a ribbon mixer, a rotating pan with offset blade, a tumbling barrel, a double cone mixer, and the like.

Clay particles or synthetic granules having a size to allow their passage through a 6 mesh sieve screen are preferred herein as the major constituents of the compositions of this invention. It is pointed out that clay particles or synthetic granules known in the art as "fines", i.e., those which will pass through a 40 mesh sieve screen, are also preferably present in the mixtures of this invention as a constituent thereof. It is preferred that the compositions of this invention contain at least a total of about 1 weight percent of −40 mesh material, and more preferably, a total of 3 to about 5 weight percent of such fines are present.

It is still more preferable that the size distribution of the compositions of this invention include a total of at least about 50 weight percent of both clay particles and synthetic granules which will pass through a 6 mesh sieve screen and be retained on a 40 mesh sieve screen, i.e., 6/40 mesh constituents. Most preferably, the size distribution is such that at least about 60 weight percent of the composition will pass through a 6 mesh sieve screen and be retained on a 40 mesh sieve screen, and about 3 to about 5 weight percent of the composition will pass through a 40 mesh sieve screen.

The compositions of this invention have been used in cat litter boxes, and their sorbing and deodorizing characteristics determined. The results of these determinations indicate that the compositions of this invention have superior sorbing and deodorizing characteristics compared to their synthetic granule constituents, and the deodorizing characteristics are not too dissimilar to the deodorizing characteristics of the fuller's earth clay constituent when used alone. It has also been observed that even when a cat litter box filled with synthetic absorbent alone and used for its intended purpose has developed an acrid odor, this odor can be abated by stirring in the clay particles.

Certain terms or properties that have been used or referred to in the present specification, including the following Examples, are defined or determined as follows:

(1) "Bulk Density" is the measured loose packed density of granules. A graduated cylinder is completely filled with the product without tamping. The bulk density in kilograms per liter (kg/l) is determined by dividing the weight of the sample in kilograms by the volume of the sample in liters.

(2) "Standard Water Sorption" is determined by the following procedure. The Standard Water Sorption capacities obtained by this procedure are useful in characterizing the clay particle and synthetic granule constituents, but are not particularly useful in characterizing the compositions of this invention, as is seen from the graph of FIG. 1 wherein the relatively low value for the composition of this invention (Sample 3) predicts a composition which appears to be less sorbent than what is found in actual practice. A possible reason for this may be that the compositions of this invention, while having other uses, are primarily useful in applications where there are standing liquids, as in a cat litter box, and the pour through technique described below does not approximate that condition as closely as might be desired.

In determining the Standard Water Sorption, a sample of about 50 grams of product is weighed to the nearest 0.1 gm. and poured into a glass tube measuring 9 inches in length and 30 mm. in internal diameter. The glass tube is maintained in a vertical position and one end of the tube is covered with a No. 18-mesh screen. Fine particles passing through the screen are collected and returned to the top of the tube. The glass tube is held on a tripod stand and positioned at a 30° angle to the horizontal. A 100 ml. graduated cylinder is placed under the tube at the screen.

Then, 75 ml. of water are pipetted through the open end of the 9 inch long glass tube onto the sample. The water is sorbed by the sample until the saturation point is reached and the surplus water begins draining into the graduated glass cylinder. This step is continued until all portions of the sample in the tube are wet. After insuring that no part of the sample in the tube is dry, the tube is allowed to drain for 30 minutes. Since 75 ml. of water were initially present in the pipette, and since any water not sorbed by the sample in the tube is collected in the graduated cylinder below the tube, the amount of water sorbed is equal to the initial 75 ml. quantity less the volume of water collected in the graduated cylinder. This amount is divided by the weight of the sample in grams to provide the sorption capacity of the sample in units of ml./gm., which units are then converted into percentages by weight.

(3) "Standard Oil Sorption" is determined in accordance with the test specified in Bulletin P-A-1056, Federal Specification, Absorbent Material, Oil and Water (For Floors and Decks), issued by the General Services Administration of the United States of America. The observed sorption capacity in units of ml./gm. are converted to percentages.

The present invention is further illustrated by the following examples.

EXAMPLE 1

Water Retention Measurements

As noted hereinbefore, the "Standard Water Sorption" determination which has been found useful in characterizing the clay particles and synthetic granules from which the compositions of this invention are prepared is not particularly useful in characterizing the compositions of this invention. Consequently, a new method has been devised which more closely approximates the sorption conditions found in the presence of a standing liquid, such as water or excreted body fluids.

According to this method, a 400 cubic centimeter sample of the material to be examined is placed in a lipped dish, such as a Petri dish, so that a rounded, approximately symmetrical mound about one inch thick at its thickest point (the center) is produced. Thereafter, a measured amount of water is poured gently onto the sample mound at its center, and the water is allowed to remain in contact with the particulate material for about 45 minutes. At the end of that time period, any unsorbed, rejected water is drained off and measured. The results of these measurements are conveniently reported, and graphed, as either a percentage of the water retained by the sample material based upon the amount added, or as the amount of water rejected by the sample.

The graph of FIG. 1 shows a comparison of Standard Water Sorption data and Water Retention Measurement data for eight samples of particulate sorbent materials. The eight samples include two fuller's earth clays (samples 1 and 2), a mixture of this invention (sample 3), three synthetic sorbant granules prepared by the method of U.S. Pat. No. 4,264,543 (samples 4–6), a commercially available synthetic sorbent (sample 7) and a commercial product for litter boxes (sample 8). Physical characteristics for each of these materials are listed in Table 1, below, with screen analyses listed in Table 2, thereafter.

TABLE 1

Physical Characteristics

| Sample | Bulk density (kg/l) | Standard Sorption (% of wt.) | Water Retention (% of amt. added)[1] |
|---|---|---|---|
| (1) Georgia white clay | 0.58 | 102 | 100 |
| (2) Georgia brown clay | 0.51 | 104 | 100 |
| (3) Composition of this invention[2] | 0.67 | 60 | 89 |
| (4) Synthetic granules No. 1[3] | 0.71 | 54 | 69 |
| (5) Synthetic granules No. 2[4] | — | 42 | 64 |
| (6) Synthetic granules No. 3[4] | — | 34 | 45 |
| (7) Commercially available synthetic granules[5] | 0.75 | 44 | 75 |
| (8) Commercially available cat litter | 0.44 | 84 | 73 |

[1]Two hundred milliliters of water were used for each Water Sorption Measurement.
[2]A hand-mixed composition of Example 2 was used which contained 20 weight percent Georgia white clay particles and 80 weight percent synthetic calcium sulfate dihydrate granules.
[3]The synthetic granule constituent of Example 2 was used.
[4]Synthetic calcium sulfate dihydrate granules prepared by disc pelletizing, crushing and sizing as described in U.S. Pat. No. 4,264,543 were used.
[5]Calcium sulfate dihydrate-containing granules.

TABLE 2

| Screen Size No. | Screen Analysis Sample Number (% retained) | | | | | | | |
|---|---|---|---|---|---|---|---|---|
| | 1 | 2 | 3* | 4 | 5 | 6 | 7 | 8 |
| 2/6 | 35.2 | — | 16.2 | 11.4 | 50 | 100 | 0.9 | 13.4 |

TABLE 2-continued

| Screen Size No. | Screen Analysis Sample Number (% retained) | | | | | | | |
|---|---|---|---|---|---|---|---|---|
| | 1 | 2 | 3* | 4 | 5 | 6 | 7 | 8 |
| +20 | 50.4 | — | 72.6 | 78.1 | — | — | 87.5 | 83.5 |
| +30 | 7.7 | — | 5.9 | 5.4 | — | — | 5.8 | 2.3 |
| +40 | 2.9 | — | 3.0 | 3.0 | 50 | — | 4.5 | 0.3 |
| +60 | 1.2 | — | 1.4 | 1.4 | — | — | 0.6 | 0.1 |
| pan | 2.6 | — | 1.1 | 0.7 | — | — | 0.7 | 0.4 |

*Screen analysis calculated from the screen analyses of the constituents of the mixture multiplied by the percentage of each constituent present in the mixture, assuming no degradation of material size on mixing.

As can be seen from the data of Table 1, and the graph of FIG. 1, the fuller's earth clays (samples 1 and 2) have the highest sorbency. It is also seen that while the composition of this invention (sample 3) appeared to possess less sorbency than did the commercial cat litter product (sample 8) when the Standard Water Sorption determination was made, data from the measurements described hereinabove indicate a composition with superior sorbency for standing water as is found in a cat litter box.

EXAMPLE 2

Particulate Sorbent Granules

A particulate sorbent composition of this invention was prepared by hand-mixing sorbent Georgia white fuller's earth clay particles with sorbent calcium sulfate dihydrate granules prepared following the method of U.S. Pat. No. 4,264,543. Pertinent physical properties for the constituents of this composition are listed in Tables 1 and 2 of Example 1.

Figure 2:
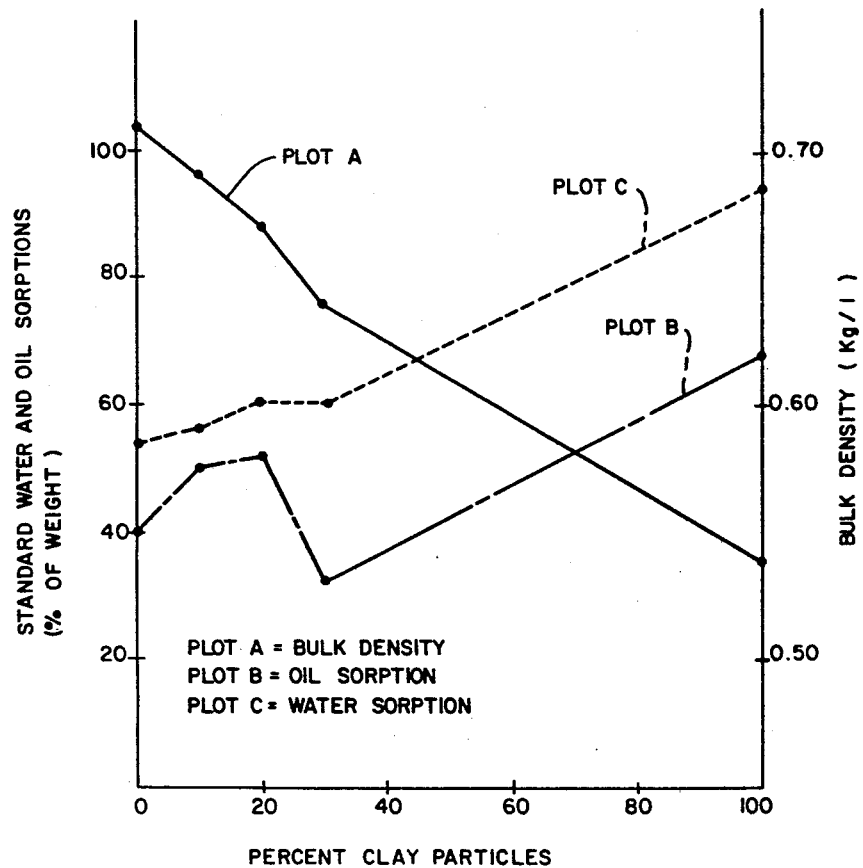
FIG. 2 is a plot of Standard Water and Oil Sorption data and bulk density for compositions of this invention and their constituents.

FIG. 2 illustrates graphical plots of Standard Water and Oil Sorption, and bulk density data (ordinates) against the weight percentage of clay particles in the composition (abscissa). As already noted, the plot of bulk densities (Plot A) is almost linear between the values for the two composition constituents, while the plot for oil sorption (Plot B) shows a large anomoly in the range of constituents utilized in this invention. The plot for Standard Water Sorption (Plot C) shows only a slight anomoly in the range of constituents of this invention.

The plots of Water Retention Measurement data in the graphs of FIG. 3 for the same compositions of this Example illustrate the unexpected behavior of the synergistic compositions of this invention. Examination of Plots E through H, for additions of 175, 200, 225 and 250 milliliters of water, respectively, to individual 400 milliliter samples illustrates the unexpected, non-linear sorptions of the compositions of this invention.

EXAMPLE 3

Sorbent Compositions With Varying Amounts of 2/6 Mesh Clay Particles

The effect of the amount of relatively large size clay particles on water sorbency, measured as in Example 1, was determined. A commercial quantity of Georgia white clay particles was sieved to eliminate 2/6 mesh particles. Thereafter, enough 2/6 mesh particles were added back to the sieved clay particles to constitute zero, 20, 40 and 60 weight percent of the total weight of the particles. The reconstituted clay particles were then hand mixed with synthetic calcium sulfate dihydrate granules to prepare particulate sorbents.

Sieve screen analyses of the original clay particles and synthetic granules are listed below in Table 3. Data showing the amount of water drained as measured by the technique of Example 1 for 400 milliliter particulate sorbent samples and additions of 225 milliliters of water to each sample are plotted in the graphs of FIG. 4.

TABLE 3

| Screen Size No. | Sieve Screen Analysis of Starting Components (% retained) | |
|---|---|---|
| | Georgia White Clay Particles | Synthetic Sorbent Granules* |
| 2/6 | 2.8 | 8.8 |
| +20 | 62.8 | 77.4 |
| +30 | 8.4 | 6.0 |
| +40 | 2.8 | 4.8 |
| +60 | 1.5 | 2.0 |
| pan | 1.8 | 1.1 |

*Sorbent, synthetic calcium sulfate dihydrate granules prepared following the method of U.S. Pat. No. 4,264,543.

Figure 4:
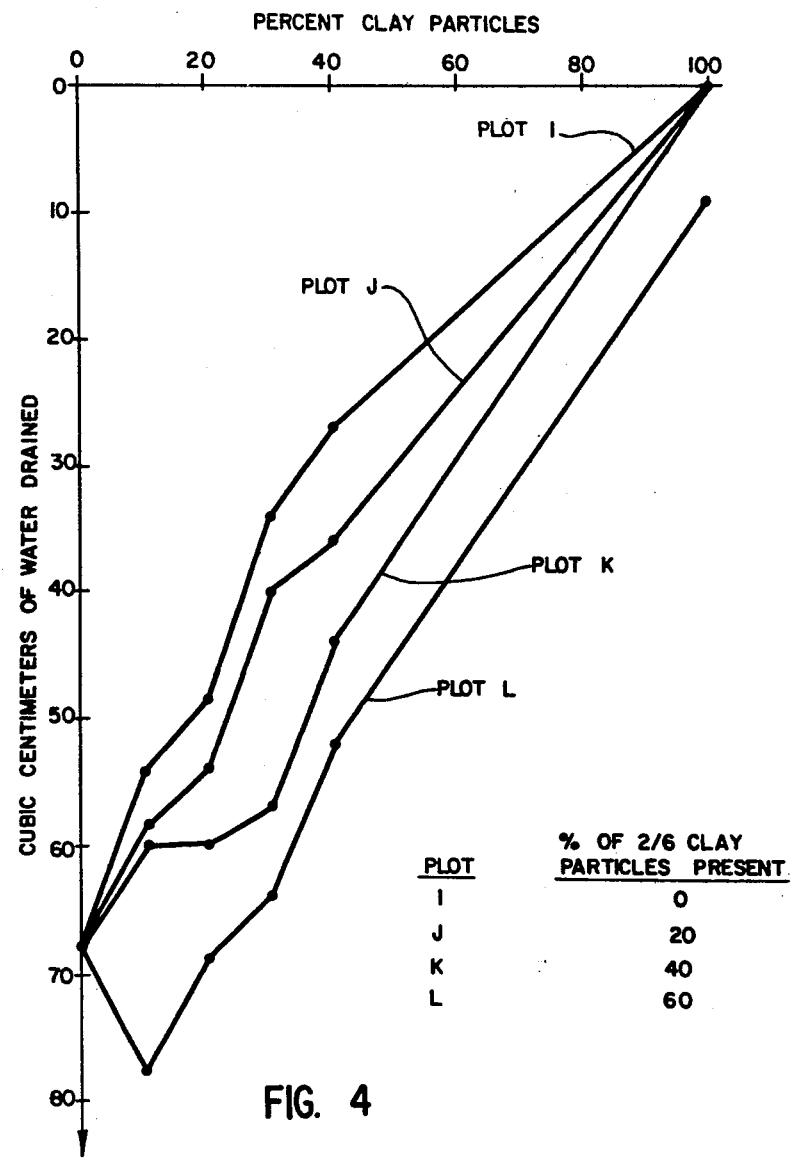
FIG. 4 is a series of plots of Water Sorption Measurement data for compositions of this invention illustrating the effect on water sorption of varying the amount of relatively larger-sized clay particles in the compositions.

Examination of the graphs of FIG. 4 indicates quite clearly that increasing the amount of 2/6 clay particles in sorbent compositions (going from Plot I to Plot L) has a deleterious effect upon water sorption.

EXAMPLE 4

Sorbent Compositions Without −40 Mesh Materials

Water Sorption Measurements were conducted to determine the effect on water sorption of the absence of sorbing materials which will pass through a 40 mesh sieve screen. Georgia white clay particles were used as were synthetic calcium sulfate dihydrate granules prepared following the method of U.S. Pat. No. 4,264,543.

In this instance, each of the constituents was pre-sieved and recombined so that each contained 12 weight percent 2/6 mesh material and 88 weight percent 6/40 material. Plots illustrating Water Sorption Measurement data (Example 1) are shown in the graphs of FIG. 5 for the addition of 150, 175, 200, 225 and 250 milliliter additions of water to 400 milliliter samples of particulate sorbent.

Comparison of the plots of the graphs of FIG. 5 to those of FIG. 3 illustrate the fact that sorbent materials sized to pass through a 40 mesh sieve screen improve the total sorbency of the sorbent compositions.

The foregoing description and examples are intended as illustrative and are not limiting. Still other variations are possible without departing from the spirit and scope of the present invention. The invention is defined by the claims which follow.

We claim:

1. A particulate, water and oil sorbing composition comprising a substantially uniform mixture of fuller's earth sorbent clay particles and sorbent synthetic particles, said clay particles being present relative to said synthetic particles in a ratio by weight of about 0.5:9.5 to about 4:6;

wherein said clay particles have a bulk density of about 0.4 to about 0.9 kilograms per liter, sorb water or oil in an amount of more than about 50 percent of the weight of said particles, and have a size distribution such that no more than about 60 weight percent of said particles pass through a 2 mesh sieve screen and are retained on a 6 mesh sieve screen; and wherein said synthetic particles have a bulk density of about 0.5 to about 0.9 kilograms per liter, sorb water or oil in an amount of more than about 30 percent of the weight of said particles, and have a size distribution such that no more than about 25 weight percent of said particles pass through a 2 mesh sieve screen and are retained on a 6 mesh sieve screen.

2. The composition according to claim 1 wherein said weight ratio is about 1:9 to about 3:7.

3. The composition according to claim 1 wherein said weight ratio is about 1.5:8.5 to about 2.5:7.5.

4. The composition according to claim 1 wherein said clay particles have a size distribution such that no more than about 40 weight percent pass through a 2 mesh sieve screen and are retained on a 6 mesh sieve screen.

5. The composition according to claim 1 wherein said clay particles have a size distribution such that no more than about 20 weight percent pass through a 2 mesh sieve screen and are retained on a 6 mesh sieve screen.

6. The composition according to claim 1 wherein said synthetic particles have a size distribution such that no more than about 15 weight percent pass through a 2 mesh sieve screen and are retained on a 6 mesh sieve screen.

7. The composition according t claim 1 wherein said clay particles have a bulk density of about 0.4 to about 0.65 kilograms per liter.

8. The composition according to claim 1 wherein said clay particles sorb water or oil in an amount of more than about 60 percent of the weight of said particles.

9. The composition according to claim 1 wherein said clay particles sorb water or oil in an amount of more than about 80 percent of the weight of said particles.

10. The composition according to claim 1 wherein said synthetic particles are calcium sulfate dihydrate-containing granules.

11. The composition according to claim 10 wherein said synthetic, calcium sulfate dihydrate-containing granules have a bulk density of about 0.5 to about 0.8 kilograms per liter.

12. The composition according to claim 10 wherein said synthetic, calcium sulfate dihydrate-containing granules sorb water or oil in an amount of more than about 50 percent of the weight of said granules.

13. The composition according to claim 10 further comprising a water or oil sorbing constituent, said water or oil sorbing constituent comprising calcium carbonate, portland cement, vermiculite, pumice, activated carbon, diatomaceous earth, wood chips or sawdust, in addition to said sorbant clay particles and said synthetic, calcium sulfate dihydrate-containing granules.

14. The composition according to claim 10 wherein said synthetic, calcium sulfate dihydrate-containing granules contain at least about 50 weight percent calcium sulfate dihydrate.

15. A particulate, water and oil sorbing composition comprising a substantially uniform mixture of sorbent fuller's earth clay particles and sorbent synthetic calcium sulfate dihydrate granules, said clay particles being present relative to said calcium sulfate dihydrate granules at a ratio by weight of about 1:9 to about 3:7; wherein said clay particles have a bulk density of about 0.4 to about 0.65 kilograms per liter, sorb water or oil in an amount of more than about 60 percent by weight of said particles, and have a size distribution such that no more than about 40 weight percent of said particles pass through a 2 mesh sieve screen and are retained on a 6 mesh sieve screen; and wherein said synthetic calcium sulfate dihydrate granules have a bulk density of about 0.5 to about 0.8 kilograms per liter, sorb water or oil in an amount of more than about 50 percent of the weight of said granules, and have a size distribution such that no more than about 15 weight percent pass through a 2 mesh sieve screen and are retained on a 6 mesh sieve screen.

16. The composition according to claim 15 wherein at least about 1 percent by weight of said composition is of a size to pass through a 40 mesh sieve screen.

17. The composition according to claim 15 wherein about 3 to about 5 weight percent of said composition is of a size to pass through a 40 mesh sieve screen.

18. The composition according to claim 15 wherein at least about 50 weight percent of said composition passes through a 6 mesh sieve screen and is retained on a 40 mesh sieve screen.

19. The composition according to claim 15 wherein at least about 60 weight percent of said composition passes through a 6 mesh sieve screen and is retained on a 40 mesh sieve screen, and about 3 to about 5 weight percent of said composition passes through a 40 mesh sieve screen.

20. A method for preparing a particulate, water and oil sorbing composition having odor-abating properties which comprises the steps of combining particulate, sorbent fuller's earth clay and a particulate synthetic sorbent in a weight ratio of about 0.5:9.5 to about 4:6 and agitating the resulting combination until a substantially uniform mixture is obtained.

21. The method according to claim 20 wherein said particulate synthetic sorbent comprises synthetic calcium sulfate dihydrate granules, said granules containing at least about 50 weight percent calcium sulfate dihydrate.

22. The method according to claim 21 wherein the weight ratio of said particulate fuller's earth clay to said calcium sulfate dihydrate granules is about 1.5:8.5 to about 2.5:7.5.

23. The method according to claim 20 wherein said particulate fuller's earth has a bulk density of about 0.4 to about 0.9 kilograms per liter, sorb water or oil in an amount of more than about 50 percent of the weight of said particles, and have a size distribution such that no more than about 60 weight percent of said particles pass through a 2 mesh sieve screen and are retained on a 6 mesh sieve screen, and said particulate synthetic sorbent has a bulk density of about 0.5 to about 0.9 kilograms per liter, sorbs water or oil in an amount of more than about 30 percent of the weight of said synthetic sorbent, and has a size distribution such that no more than about 25 weight percent of said synthetic sorbent passes through a 2 mesh sieve screen and is retained on a 6 mesh sieve screen.

* * * * *